(12) United States Patent
Huang et al.

(10) Patent No.: US 9,131,480 B2
(45) Date of Patent: Sep. 8, 2015

(54) TECHNIQUES TO MANAGE GROUP CONTROLING SIGNALING FOR MACHINE-TO-MACHINE DEVICES

(75) Inventors: Rui Huang, Beijing (CN); Honggang Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 566 days.

(21) Appl. No.: 13/434,895

(22) Filed: Mar. 30, 2012

(65) Prior Publication Data

US 2013/0258953 A1    Oct. 3, 2013

(51) Int. Cl.
*H04W 72/04* (2009.01)
*H04W 72/12* (2009.01)
*H04W 4/00* (2009.01)
*H04W 4/08* (2009.01)

(52) U.S. Cl.
CPC .......... *H04W 72/0406* (2013.01); *H04W 4/005* (2013.01); *H04W 4/08* (2013.01); *H04W 72/121* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 6,073,035 A | 6/2000 | Witter | |
| 6,333,939 B1 | 12/2001 | Butler et al. | |
| 6,353,893 B1 | 3/2002 | Liu et al. | |
| 8,619,687 B2 * | 12/2013 | Choudhury et al. | 370/329 |
| 2004/0033812 A1 | 2/2004 | Matsunaga et al. | |
| 2004/0218556 A1 | 11/2004 | Son et al. | |
| 2006/0029011 A1 | 2/2006 | Etemad et al. | |
| 2006/0030305 A1 | 2/2006 | Lee et al. | |
| 2006/0050709 A1 | 3/2006 | Sung et al. | |
| 2006/0079232 A1 | 4/2006 | Omori et al. | |
| 2006/0193296 A1 | 8/2006 | Zhong et al. | |
| 2007/0087767 A1 | 4/2007 | Pareek et al. | |
| 2007/0201423 A1 | 8/2007 | Laroia et al. | |
| 2007/0248071 A1 | 10/2007 | Hui et al. | |
| 2008/0031173 A1 | 2/2008 | Zhang et al. | |
| 2008/0084941 A1 | 4/2008 | Mohanty et al. | |
| 2008/0165721 A1 | 7/2008 | Fujii et al. | |
| 2008/0233905 A1 | 9/2008 | Mohanty et al. | |

(Continued)

FOREIGN PATENT DOCUMENTS

| KR | 1020090032929 | 4/2009 |
|---|---|---|
| KR | 1020120010202 | 2/2012 |

(Continued)

OTHER PUBLICATIONS

Draft Amendment to IEEE Standard WirelessMAN-Advanced Air Interface for Broadband Wireless Access Systems; IEEE P802.16.1b/D2; Jan. 2012.

(Continued)

*Primary Examiner* — Hicham Foud
(74) *Attorney, Agent, or Firm* — Kacvinsky Daisak Bluni PLLC

(57) ABSTRACT

Techniques to manage group control signaling for machine-to-machine (M2M) devices are described. An apparatus may comprise a processor circuit, and a M2M control component arranged for execution by the processor circuit to manage M2M group control signaling in a wireless network for multiple M2M devices in a M2M group, the M2M control component to generate a resource allocation for multiple M2M devices of a M2M group, generate a M2M group control message with the resource allocation, and send the M2M group control message to the M2M devices in the M2M group. Other embodiments are described and claimed.

11 Claims, 9 Drawing Sheets

(56) References Cited

U.S. PATENT DOCUMENTS

| | | | |
|---|---|---|---|
| 2010/0118810 A1* | 5/2010 | Qu et al. ................ | 370/329 |
| 2010/0169498 A1 | 7/2010 | Palanki et al. | |
| 2012/0044815 A1 | 2/2012 | Geirhofer et al. | |
| 2012/0257571 A1* | 10/2012 | Liao .................... | 370/328 |
| 2012/0287854 A1* | 11/2012 | Xie et al. ............. | 370/328 |
| 2013/0077594 A1* | 3/2013 | Park et al. ........... | 370/329 |
| 2013/0336278 A1* | 12/2013 | Kim et al. ............ | 370/329 |
| 2014/0133430 A1* | 5/2014 | Yang et al. ........... | 370/329 |

FOREIGN PATENT DOCUMENTS

| | | |
|---|---|---|
| WO | 2011155778 | 12/2011 |
| WO | WO 2011155778 A3 * | 2/2012 |

OTHER PUBLICATIONS

Rui Huang, Honggong Li, Shantidev Mohanty, Hujun Yin, Belal Hamzeh; Proposed text for addressing of STID Addressing Scheme in IEEE 802.16p system; IEEE C802.16p-11/0014; Mar. 3, 2011; IEEE.

Draft Amendment to IEEE Standard for Air Interface for Broadband Wireless Access Systems; IEEE P802.16p/D3 Jan. 2012.

International Search Report and Written Opinion received for PCT Patent Application No. PCT/US2013/033863, mailed Jul. 10, 2013, 13 pages.

\* cited by examiner

TECHNIQUES TO MANAGE GROUP CONTROLING SIGNALING FOR MACHINE-TO-MACHINE DEVICES

BACKGROUND

Machine to Machine (M2M) communications is emerging as a dynamic technology enabling an "Internet of things" to exchange information without human interaction. Recent trends predict an exponential increase in a number of M2M devices in a mobile broadband network, including devices of the type used as parking meters, surveillance cameras, utility meters, and other non-human interface applications.

These massive numbers of M2M devices result in a corresponding increase in control signaling and overhead in a wireless network. For instance, a base station may need to send various control messages to each M2M device, such as information for setting up or tearing down a connection, station identifiers, paging cycles, modulation and coding schemes, power schemes, smart antenna configuration information, and other administrative, management or control information. Each control message may consume network resources and cause network congestion, which in turn may affect voice and data communications. As such, techniques to reduce a number of control messages used to control M2M devices in a wireless network are needed to increase efficient use of network resources, which could then be re-allocated to other network uses (e.g., data transmissions) and network devices (e.g., human interface devices). It is with respect to these and other considerations that the present improvements have been needed.

DETAILED DESCRIPTION

Figure 1:
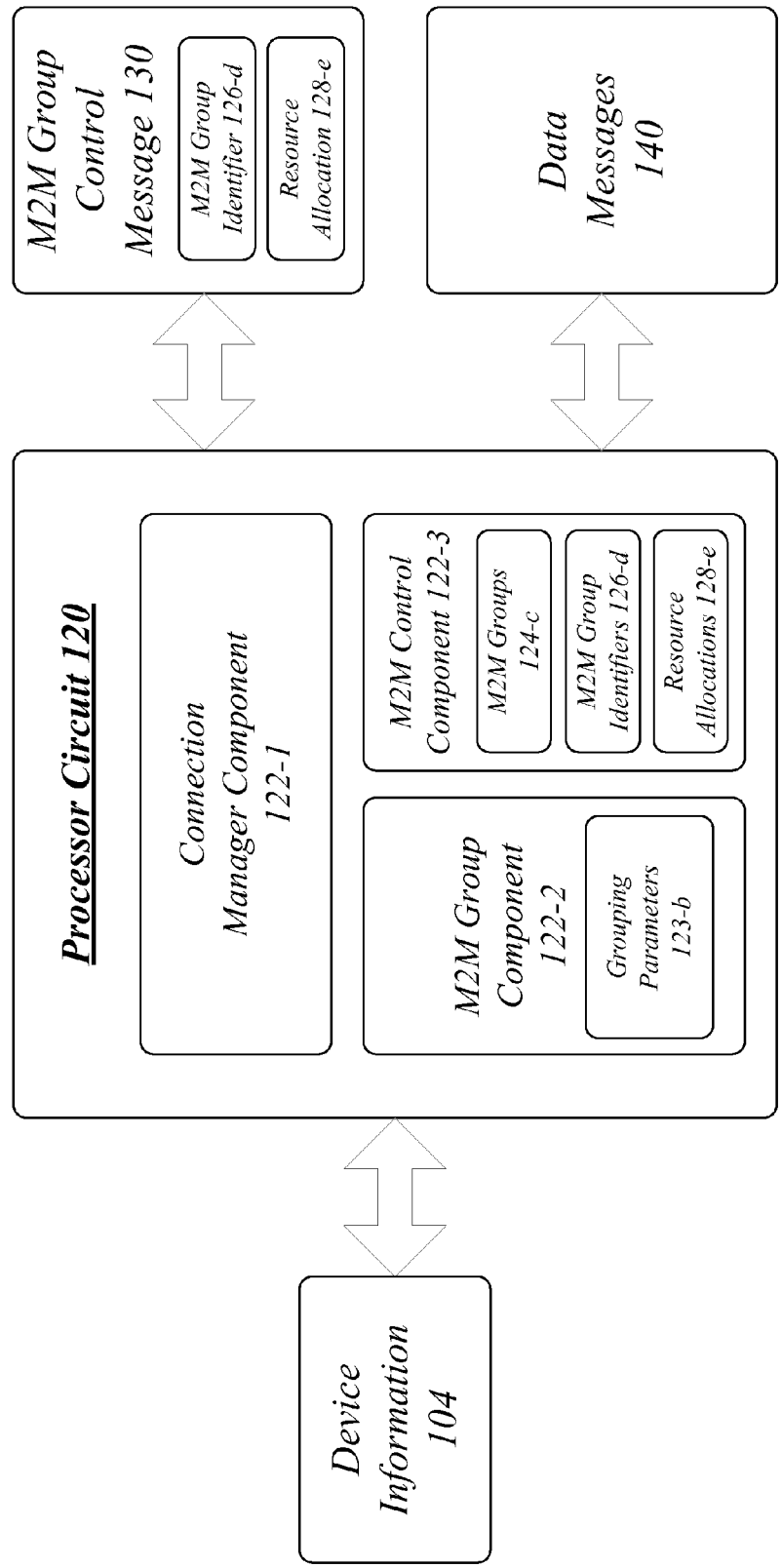
FIG. 1 illustrates an embodiment of an apparatus.

Embodiments are generally directed to improvements for wireless networks. More particularly, embodiments are directed to improvements in M2M group control signaling for groups of M2M devices using wireless mobile broadband technologies. A M2M device is any device that is capable of providing M2M communication. M2M communication is an information exchange between user devices through a network access device, such as a base station, or between a device and a server in the core network through a base station that may be carried out without any human interaction.

Wireless mobile broadband technologies may include any wireless technologies suitable for use with M2M devices, such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The embodiments are not limited in this context.

By way of example and not limitation, various embodiments may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 and P802.16p/D3, both dated January 2012 and titled "Draft Amendment to IEEE Standard for WirelessMAN-Advanced Air Interface for Broadband Wireless Access Systems, Enhancements to Support Machine-to-Machine Applications" ("IEEE 802.16p"), or other IEEE 802.16 standards (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The embodiments are not limited in this context.

As previously described, the proliferation of M2M devices in a network may result in massive amounts of control messages and/or signals to manage the M2M devices. One technique to reduce this volume of control overhead is to assign multiple M2M devices to a M2M group, and apply M2M group control signaling for the entire M2M group. Common control messages could then be shared by all M2M devices in a given M2M group. For example, if M2M devices were grouped according to a service data unit (SDU) size and channel quality indicator (CQI), common control messages for modulation and coding scheme (MCS) and power control may be sent to the entire M2M group. This would reduce control overhead of a M2M group of K devices to 1/K, where K represents any positive integer.

However, M2M group control messages arranged to share common control messages alone are insufficient to compensate for the exponential growth of M2M devices. In many cases, dedicated messages are still needed for specific M2M devices within a M2M group. Prior solutions attempt to solve this problem through use of techniques optimized for human interface devices, such as dynamic scheduling or persistent scheduling techniques implemented by IEEE 802.16m, for example. In dynamic scheduling, each data packet is scheduled by media access control (MAC) layer and/or physical (PHY) layer control signaling, such as assignment using an information element such as A-A-MAP as defined in IEEE 802.16m by which the system could schedule data every subframe. This is very flexible scheduling technique which increases scheduling gain due to frequency and time domain diversity. However, this benefit comes at a cost of high signaling overhead. If the dynamic scheduling technique of IEEE 802.16m were to be applied to M2M device traffic, this would result in a large amount of overhead, as demonstrated in Table 1 as follows:

TABLE 1

| Downlink A-AMAP Size | | 33 Bits |
|---|---|---|
| M2M Data Packet Size | Home Meter: 8 * 8 | Home Security: 30 * 8 |
| Control Signaling Overhead | 34% | 12% |

In persistent scheduling, assignment overhead may be reduced for connections with periodic traffic patterns and relatively fixed payload sizes. However, a M2M packet data unit (PDU) is relatively small, and therefore a time slot assigned to a given M2M device may not be used in every transmission interval, thereby leading to a potential waste of allocated resources.

To solve these and other problems, embodiments provide enhanced M2M group signaling techniques specifically customized for unique M2M traffic patterns. M2M traffic is characterized by smaller data transmissions, infrequent data transmissions, and latency tolerance. Embodiments offer enhanced M2M group signaling techniques that efficiently communicate control information to a large number of M2M devices based on these and other M2M traffic characteristics. More particularly, a M2M group control message may be used to communicate control information for multiple M2M devices in a M2M group. In one embodiment, the M2M group control message may include one or more common control messages for all of the M2M devices in the M2M group. In one embodiment, the M2M group control message may include one or more dedicated control messages for one or more of the M2M devices in the M2M group. In one embodiment, the M2M group control message may include both common control messages and dedicated control messages. In this manner, control overhead for a M2M group may be reduced. Furthermore, the M2M group control message may be sent in a single frame and/or subframe defined for a given network, or across multiple frames and/or subframes. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an apparatus 100. Although the apparatus 100 shown in FIG. 1 has a limited number of elements in a certain topology, it may be appreciated that the apparatus 100 may include more or less elements in alternate topologies as desired for a given implementation.

The apparatus 100 may comprise a computer-implemented apparatus 100 having a processor circuit 120 arranged to execute one or more software components 122-*a*. It is worthy to note that "a" and "b" and "c" and similar designators as used herein are intended to be variables representing any positive integer. Thus, for example, if an implementation sets a value for a=5, then a complete set of software components 122-*a* may include components 122-1, 122-2, 122-3, 122-4 and 122-5. The embodiments are not limited in this context.

In various embodiments, the apparatus 100 may be implemented in any electronic device having access to wireless capabilities or equipment. For example, the apparatus 100 may be implemented in system equipment, user equipment, or a core network for a wireless system.

In one embodiment, the apparatus 100 may be implemented in system equipment for a communications system or network compliant with one or more 3GPP LTE Specifications or IEEE 802.16 Standards. For example, the apparatus 100 may be implemented as part of a base station, advanced base station (ABS), eNodeB, or any other fixed or mobile access point for a Wireless Metropolitan Area Network (WMAN) or LTE network, or other network devices. Although some embodiments are described with reference to a base station or eNodeB, embodiments may utilize any network equipment for a communications system or network. The embodiments are not limited in this context.

In one embodiment, the apparatus 100 may be implemented in user equipment (UE) for a communications system or network, such as a communications device compliant with one or more 3GPP LTE Specifications or IEEE 802.16 Standards. For example, the apparatus 100 may be implemented as part of a M2M device compliant with one or more IEEE 802.16 Standards. Although some embodiments are described with reference to a M2M device, embodiments may utilize any user equipment for a communications system or network. The embodiments are not limited in this context.

The apparatus 100 may comprise the processor circuit 120. The processor circuit 120 may be generally arranged to execute one or more software components 122-*a*. The processing circuit 120 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as the processing unit 120.

The apparatus 100 may comprise a connection manager component 122-1. The connection manager component 122-1 may be generally arranged to manage wireless connections for the apparatus 100. This includes set-up and tear-down of the wireless connection. For example, the connection manager component 122-1 may establish a wireless connection between a device and a network access point, such as base station or eNodeB. The connection manager component 122-1 may also receive a registration request 102 from a device to register a device with the wireless network using the wireless connection. The connection manager component 122-1 may further receive a deregistration request 106 to deregister the device from the wireless network using the wireless connection. For example, once registered with a network, the device may deregister to enter idle mode while retaining capabilities to periodically receive control traffic and data traffic from the network.

The apparatus 100 may comprise a M2M group component 122-2. The M2M group component 122-2 may be generally arranged to assign a M2M device to a M2M group 124-b. For instance, the M2M group component 122-2 may receive device information 104 from the M2M devices, and form the M2M devices into a M2M group 124-b represented by a corresponding M2M group identifier (MGID) 126-d based on the device information 104.

The M2M group component 122-2 may assign a M2M device to a given M2M group 124-b based on different grouping parameters 123-b. For instance, the M2M group component 122-2 may utilize a grouping parameter 123-1 representing traffic properties or characteristics of M2M devices. The M2M group component 122-2 may receive device information 104 from each M2M device in the network, the device information 104 representing M2M traffic information for each M2M device, and aggregate M2M devices with similar traffic patterns together in a single M2M group 124-1. In another example, the M2M group component 122-2 may utilize a grouping parameter 123-2 representing M2M features of a M2M device. A M2M feature is a unique characteristic of an M2M application. One or more M2M features may be needed to support an M2M application. The M2M group component 122-2 may receive device information 104 from each M2M device in the network, the device information 104 representing M2M features for each M2M device, and aggregate M2M devices with similar M2M features together in a single M2M group 124-2. Other examples of grouping parameters 123-b may include a grouping parameter 123-3 for packet size (e.g., a SDU), a grouping parameter 123-4 for signal quality (e.g., a CQI), a grouping parameter 123-5 for latency tolerance, a grouping parameter 123-6 for M2M device type (e.g., power meter, parking meter, surveillance camera, thermal sensor, environmental sensor, biometric sensor, automotive sensor, accelerometer, etc.), and so forth. These are merely a few examples of grouping parameters 123-b, and others may be used as desired for a given implementation. The embodiments are not limited in this context.

The apparatus 100 may comprise a M2M control component 122-3. In one embodiment, the M2M control component 122-3 may be generally arranged to manage M2M group control signal operations for a communications device or a communication system, examples of which are described with reference to FIGS. 8, 9, respectively. Every mobile broadband system has some kind of control mechanism to distribute control information to multiple devices in a downlink (DL) channel from a base station, ABS or eNodeB to a M2M device, or in an uplink (UL) channel from a M2M device to a base station, ABS or eNodeB. The M2M control component 122-3 may generate M2M group control signals and/or messages, and send the M2M control signals and/or messages via a DL control channel.

In one embodiment, the M2M control component 122-3 may be arranged for execution by the processor circuit 120 to manage M2M group control signaling in a wireless network, such as a wireless mobile broadband network, for multiple M2M devices in a M2M group 124-c. The M2M control component 122-3 may generate a resource allocation 128-e for multiple M2M devices of a M2M group 124-c. The M2M control component 122-3 may generate a M2M group control message 130 with the resource allocation 128-e. The M2M control component 122-3 may send the M2M group control message 130 to the M2M devices in the M2M group 124-c. For instance, the M2M control component 122-3 may broadcast the M2M group control message 130 to the M2M devices in the M2M group 124-c using a DL control channel.

The M2M control component 122-3 may generate a resource allocation 128-e for M2M devices of a M2M group 124-c. A resource allocation 128-e may provide resource information as to when each M2M device is to communicate data. The resource information may comprise a schedule for data communications of the various M2M devices. For example, the resource information may comprise a time slot assigned to a given M2M device and an indication as to whether data will be transmitted (or received) during the assigned time slot. Each M2M group 124-c may be given a different resource allocation 128-e.

The M2M control component 122-3 may generate a M2M group control message 130 with the resource allocation 128-e. As previously described, the M2M group control message 130 attempts to aggregate control information for M2M devices of a M2M group 124-c in order to reduce overhead. The M2M control component 122-3 may be arranged to generate the M2M group control message 130 with different types of formats, fields, and encoding that match the unique properties or characteristics for M2M traffic. In one embodiment, the M2M control component 122-3 may generate the M2M group control message 130 based on a localized resource allocation scheme. In one embodiment, the M2M component 122-3 may generate the M2M group control message 130 based on a distributed resource allocation scheme with explicit resource information or differential resource information. The different resource allocation schemes may give corresponding levels of overhead reduction for a network.

Once the M2M control component 122-3 generates a resource allocation 128-e for the M2M group 124-c, the M2M control component 122-3 may generate a M2M group control message 130 having, among other types of information, the M2M group identifier 126-d and the resource allocation 128-e. The M2M control component 122-3 may send the M2M group control message 130 to the M2M devices of the M2M group 124-c using a DL control channel. By way of example, assume the M2M group component 122-2 groups a set of ten M2M devices into a M2M group 124-1 based on a grouping parameter 123-1. The M2M control component 122-3 may generate a resource allocation 128-1 for the M2M group 124-1. The M2M control component 122-3 may generate a M2M group control message 130 with a M2M group identifier 126-1 and resource allocation 128-1 for the M2M group 124-1. The M2M control component 122-3 may utilize a radio frequency (RF) transceiver coupled to the processor circuit 120 to transmit electromagnetic representations of the M2M group control message 130 to the M2M devices in the M2M group 124-1 with the MGID 126-1. The M2M control component 122-3 may then send (or receive) data messages 140 in accordance with the resource allocation 128-1.

Some exemplary operations and use scenarios for the connection manager component 122-1, the M2M group component 122-2, and/or the M2M control component 122-3 when executed by the processor circuit 120 may be described with reference to FIGS. 2-6. However, the embodiments are not limited to these examples.

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 2:
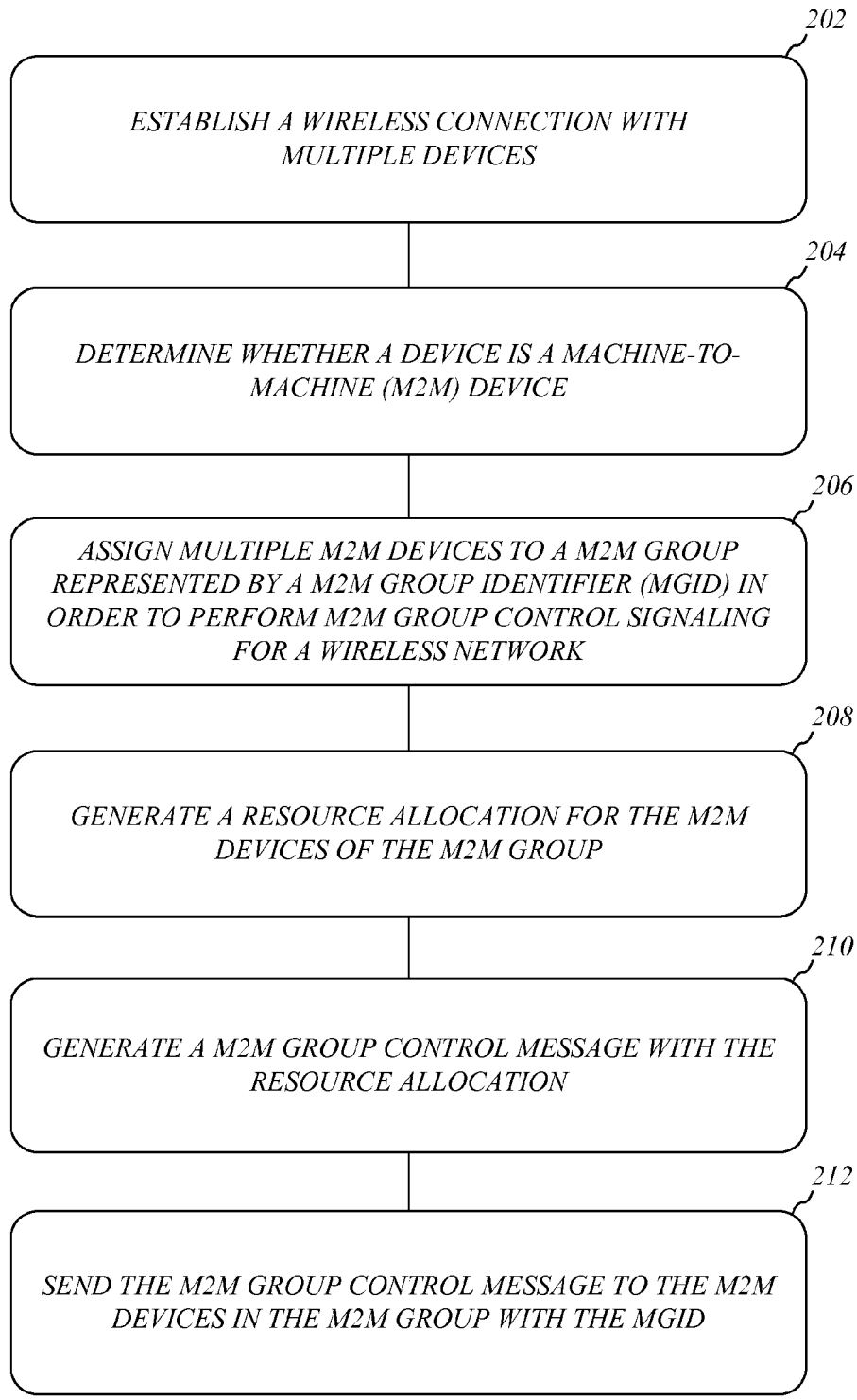
FIG. 2 illustrates an embodiment of a first logic flow.

FIG. 2 illustrates an embodiment of a logic flow 200. The logic flow 200 may be representative of some or all of the operations executed by one or more embodiments described herein, such as the apparatus 100. More particularly, the logic flow 200 may be performed by the apparatus 100 as implemented by system equipment, such as a base station or eNodeB for a radio access network.

In the illustrated embodiment shown in FIG. 2, the logic flow 200 may establish a wireless connection with multiple devices at block 202. For instance, the connection manager component 122-1 may establish a wireless connection with a device over an RF interface for a WMAN or LTE system. The connection manager component 122-1 may establish the wireless connection with a device when the device enters a cell of a wireless network, such as when the device is a mobile device. Similarly, the connection manager component 122-1 may establish a wireless connection with a device when the device powers on, such as when the device is a fixed device positioned within a cell of a wireless network. The connection manager component 122-1 may then perform any registration operations needed for the device, such as authenticating the device, registering the device with the network, assigning a network identifier to the device, allocating radio resources for the device, and other registration procedures. The connection manager component 122-2 may also perform deregistration operations for the device, such as releasing the wireless connection to allow the device to enter an idle mode in the absence of any control or data traffic for the device.

The logic flow 200 may determine whether a device is a machine-to-machine (M2M) device at block 204. For instance, the apparatus 100 may already know that a device is a M2M device based on previously received information. In another example, to the extent a device is configured with a device type, it may explicitly notify a network whether it is a M2M device or a non-M2M device in an information exchange. Similarly, a network may maintain or retrieve a list of known M2M devices and device identifiers, and the network may identify a device is a M2M device based on its device identifier. The list may include, for example, M2M devices and associated device identifiers as previously determined by the M2M group component 122-2 in a previous communication session with the M2M devices. Once a device is identified as a M2M device, the M2M group component 122-2 may assign the M2M device to a M2M group 124-c.

The M2M group component 122-2 may determine whether a device is a M2M device based on device information 104. The M2M group component 122-2 may receive device information 104 for a device over the wireless connection, and determine whether the device is a M2M group device based on the device information 104. The device information 104 may comprise any descriptive information associated with the device that is helpful in determining whether the device is a M2M device (e.g., a parking meter) or a non-M2M device (e.g., a cellular telephone). Examples of device information 104 may include without limitation device capabilities information, device locations, device locations over time, device functions, device identifiers, device names, device components, device sensor information (e.g., an accelerometer, altimeter, environmental, temperature, haptic, etc.), device telemetry, device received signal strength (RSS) or RSS indicator (RSSI), device power levels, device manual inputs, device user profiles, device control information, device data, and so forth. The embodiments are not limited in this context.

The logic flow 200 may assign multiple M2M devices to a M2M group represented by a M2M group identifier (MGID) in order to perform M2M group control signaling for a wireless network at block 206. The M2M control component 122-3 may assign multiple M2M devices to a M2M group 124-1. For example, assume the M2M group 124-1 designated as $MG_i$ is composed of multiple M2M devices
$\{M2M_1, M2M_2, \ldots, M2M_K\}$,
where K is the number of M2M devices in the M2M group 124-1.

The M2M group 124-1 may be identified by a MGID 126-1. The MGID 126-1 may comprise any identifier that uniquely identifies the M2M group 124-1 for broadcast or multicast communications. Once a M2M group 124-1 is formed, the M2M control component 122-3 may initiate M2M group control signaling for the entire M2M group 124-1, thereby reducing control overhead. In some embodiments, the MGID 126-1 may be implemented as any common identifier for a network, such as a group connection identifier (CID) or group flow identifier (FID) corresponding to the MGID and the group CID or group FID may be communicated in a generic MAC header (GMH) to the group of M2M devices to identify information intended for the group of M2M devices.

In one embodiment, the MGID 126-1 may be a MGID as defined by one or more IEEE 802.16 Standards, such as IEEE 802.16p, for example. In IEEE 802.16p (e.g., 802.16.1b/D2, January 2012), a MGID may comprise a 12-bit value that uniquely identifies a downlink multicast service flow shared by a group of M2M devices within an M2M group zone. A M2M group zone is a logical zone comprising multiple advanced base stations (ABSs). Other MGID may be used as defined by other wireless networks. The embodiments are not limited in this context.

The logic flow 200 may generate a resource allocation for the M2M devices of the M2M group at block 208. The M2M control component 122-3 may generate a resource allocation 128-1 for the M2M devices of the M2M group 124-1. For example, the M2M control component 122-3 may be implemented by a base station or eNodeB to allocate a series of resource to a specific M2M group, such as the M2M group 124-1, in a persistent manner. In some cases, the M2M control component 122-3 may schedule the resources for only some of M2M devices in $MG_i$. The list of scheduled devices and duration of when the M2M group 124-1 scheduling message is valid may be denoted as:
$\{M2M_{m1}, M2M_{m2}, \ldots, M2M_{mQ}\}$.
The scheduling activated duration could be denoted as Equation (1) as follows:

$$L_{scheduling\_active} = P * I_{repeat}, \qquad \text{Equation (1)}$$

where $$P = \text{ceil}\left(\frac{total\_packet\_size}{packet\_size\_per\_period}\right), P <= K.$$

The M2M control component 122-3 may generate a M2M device resource map with an index of scheduled devices identifying which M2M device is assigned to a particular resource, as described in more detail with reference to FIG. 5. The M2M device resource map is an example of the resource allocation 128-1 for the M2M group 124-1.

The logic flow 200 may generate a M2M group control message with the resource allocation at block 210. Once the M2M control component 122-3 generates the resource allocation 128-1, the M2M control component 122-3 may generate a M2M group control message 130 encoded with the resource allocation 128-1 (e.g., M2M device resource map).

It is worthy to note that blocks 208, 210 illustrate the resource allocation 128-1 generated before the M2M group control message 130. It may be appreciated, however, that the temporal sequence may be modified for a given implementation. For instance, the resource allocation 128-1 may be generated after the M2M group control message 130 or substantially simultaneously with the M2M group control message 130. Further, although the resource allocation 128-1 is shown as part of the M2M group control message 130, it may be appreciated that the resource allocation 128-1 and the M2M group control message 130 may be sent using separate signals, messages, packets, packet data units (PDUs), and so forth. The embodiments are not limited in this context.

The logic flow 200 may send the M2M group control message to the M2M devices in the M2M group with the MGID at block 212. The M2M control component 122-3 may send the M2M group control message 130 to the M2M devices in the M2M group 124-1 with the resource allocation 128-1 using the MGID 126-1. In various embodiments, the M2M control component 122-3 may send the M2M group control message 130 using any control message or information element defined by one or more of the 3GPP LTE Specifications and/or IEEE 802.16 Standards. In one embodiment, for example, the M2M control component 122-3 may broadcast or multicast the M2M group control message 130 in a DL control channel accessible by some or all of the M2M devices of the M2M group 124-1.

Figure 3:
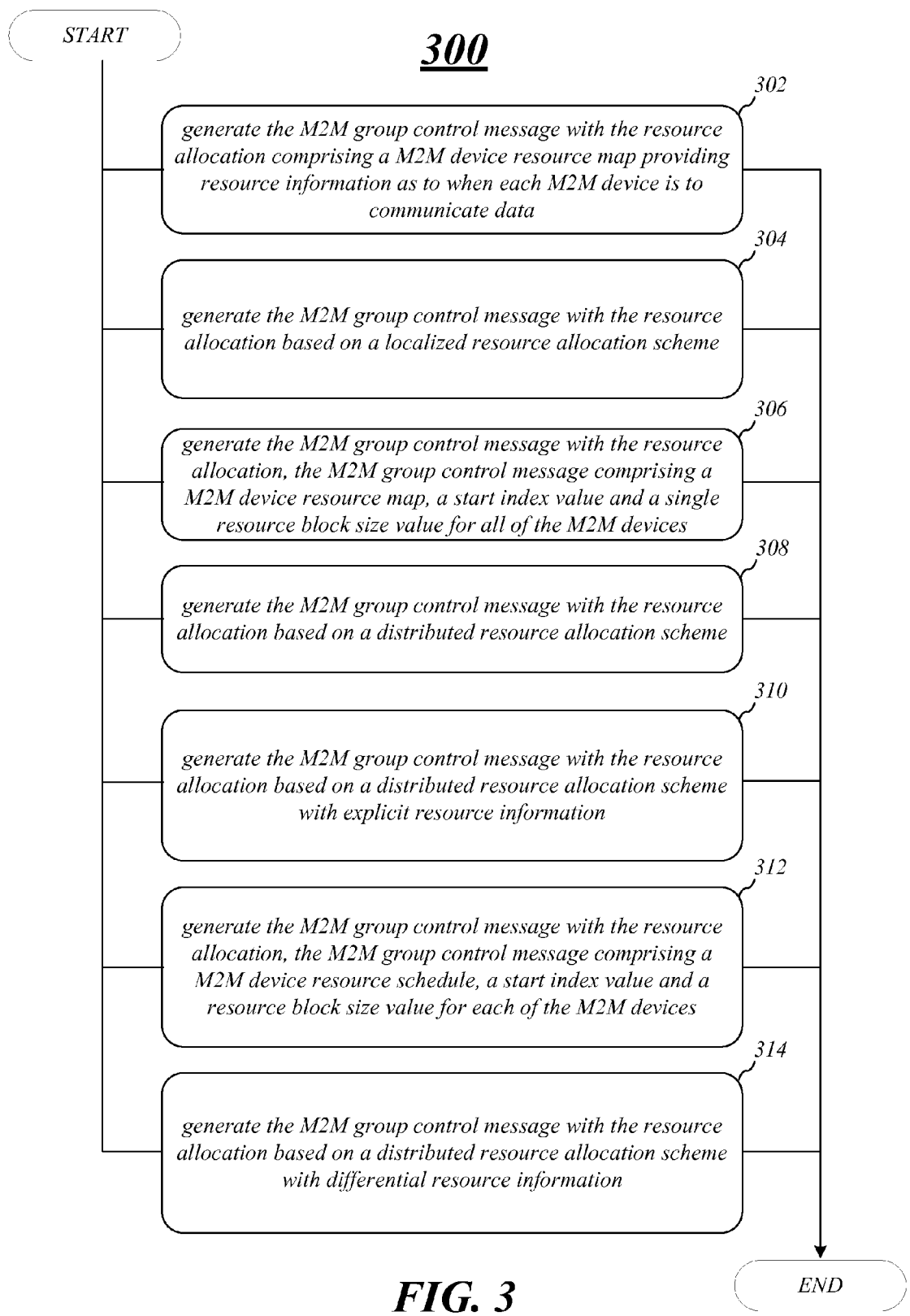
FIG. 3 illustrates an embodiment of a second logic flow.

FIG. 3 illustrates an embodiment of a logic flow 300. The logic flow 300 may be representative of some or all of the operations executed by one or more embodiments described herein, such as the M2M control component 122-3 of the apparatus 100, for example. More particularly, the logic flow 300 may be implemented by the M2M control component 122-3 to generate a M2M group control message 130 with a MGID 126-*d* and a resource allocation 128-*e* for a M2M group 124-*c*. By way of example and not limitation, the logic flow 300 may be described with reference to a M2M group control message 130 with a M2M group 124-1, a MGID 126-1 for the M2M group 124-1, and a resource allocation 128-1 for the M2M devices in the M2M group 124-1. The embodiments are not limited to this example.

In the illustrated embodiment shown in FIG. 3, the logic flow 300 may generate the M2M group control message with the resource allocation comprising a M2M device resource map providing resource information as to when each M2M device is to communicate data at block 302. Continuing with our previous example introduced in FIG. 2, the M2M control component 122-3 may generate the M2M group control message 130 with the resource allocation 128-1 comprising a M2M device resource map providing resource information as to when each M2M device is to communicate data. The M2M device resource map may include a number of scheduling blocks each corresponding to a M2M device in the M2M group 124-1, and a bit indicating whether data is to be received by the M2M device in the assigned resource of the M2M device.

The logic flow 300 may generate the M2M group control message with the resource allocation based on a localized resource allocation scheme may at block 304. In a localized resource allocation scheme, individual M2M devices in a same M2M group 124-1 are allocated resource blocks of identical size which are adjacent to each other in a system resource (e.g., a time slot). This reduces complexity and overhead for the M2M group control message 130. However, this assumes each M2M device has a same or similar payload size. Further, generating the resource allocation 128-1 needs a contiguous series of resource blocks.

The logic flow 300 may generate the M2M group control message with the resource allocation, the M2M group control message comprising a M2M device resource map, a start index value and a single resource block size value for all of the M2M devices at block 306. Consistent with the localized resource allocation scheme, the M2M control component 122-3 may generate the M2M group control message 130 with the resource allocation 128-1. The resource allocation 128-1 may comprise, among other types of information, a M2M device resource map, a start index value and a single resource block size value for all of the M2M devices. The M2M device resource map may indicate scheduled resources for each M2M device. The start index value may indicate when each M2M device is to begin receiving data from a resource block. The resource block size value may indicate for how long the M2M device is to receive the data from the resource block.

The logic flow 300 may generate the M2M group control message with the resource allocation based on a distributed resource allocation scheme at block 308. In a distributed resource allocation scheme, individual M2M devices in a same group 124-1 are allocated variable size resource blocks. Further, the variable size resource blocks are non-contiguous and may be distributed in a fragmented manner among system resources. The distributed resource allocation scheme provides flexibility, accommodates different data packet sizes, and efficiently uses system resources. However, the distributed resource allocation scheme may potentially increase overhead for the M2M group control message 130.

The logic flow 300 may generate the M2M group control message with the resource allocation based on a distributed resource allocation scheme with explicit resource information at block 310. When a data packet size for each M2M device in the M2M group 124-1 is different, the M2M control component 122-3 may generate the M2M group control message 130 with explicit resource information for each individual M2M device. For instance, assume the M2M group 124-1 has ten (10) M2M devices, with each of the 10 M2M devices having a different data packet size. In this case, the M2M group control message 130 would include values for each of the 10 packet sizes.

The logic flow 300 may generate the M2M group control message with the resource allocation, the M2M group control message comprising a M2M device resource schedule, a start index value and a resource block size value for each of the M2M devices at block 312. Consistent with the distributed resource allocation scheme with explicit resource information, the M2M control component 122-3 may generate the M2M group control message 130 with the resource allocation 128-1. The resource allocation 128-1 may comprise, among other types of information, a M2M device resource map similar to that included with the localized resource allocation scheme. However, the resource allocation 128-1 may further include a start index value and a resource block size value for each of the M2M devices. The M2M device resource map may indicate scheduled resources for each M2M device. The start index value may indicate when a given M2M device is to begin receiving data from a resource block. The resource block size value may indicate for how long each of the M2M devices is to receive the data from the given resource block.

The logic flow 300 may generate the M2M group control message with the resource allocation based on a distributed resource allocation scheme with differential resource information at block 314. When a data packet size of each M2M device in the M2M group 124-1 is similar but not always identical, the M2M control component 122-3 may indicate the differences in resource block size in a differential manner. For instance, assume the M2M group 124-1 has ten (10) M2M devices, with half of the 10 M2M devices having a same data packet size, and the other half having a different data packet size. In this case, the M2M group control message 130 would implement an algorithm to build the M2M device resource map of the resource allocation 128-1 using a differential indicator, as described in more detail with reference to FIG. 4.

Figure 4:
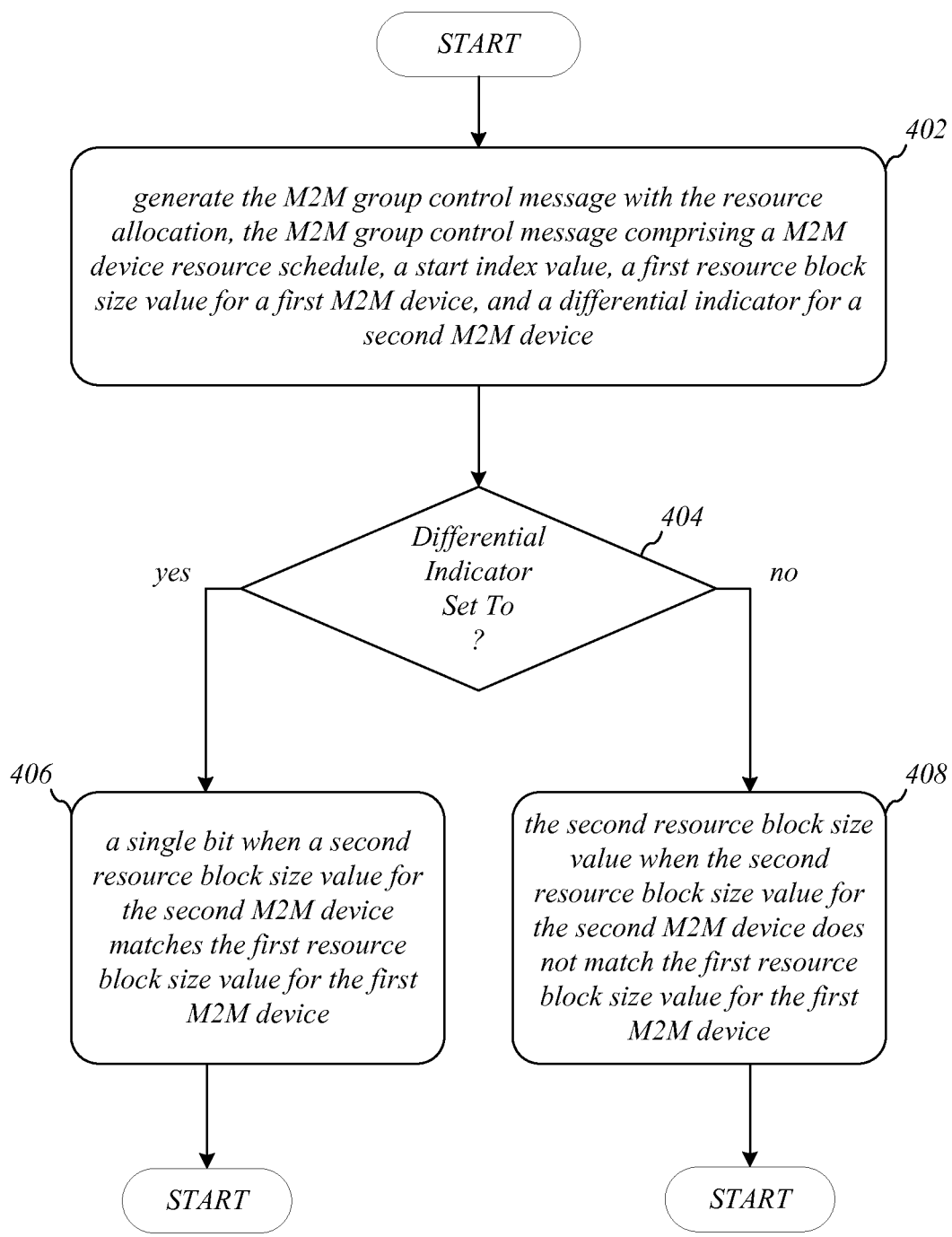
FIG. 4 illustrates an embodiment of a third logic flow.

FIG. 4 illustrates an embodiment of a logic flow 400. The logic flow 400 may be representative of some or all of the operations executed by one or more embodiments described herein, such as the M2M control component 122-3 of the apparatus 100, for example. More particularly, the logic flow 400 may illustrate an example of when the M2M control component 122-3 generates a M2M group control message 130 with differential resource information as previously described with reference to block 314 of the logic flow 300.

In the illustrated embodiments shown in FIG. 4, the logic flow 400 may generate the M2M group control message with the resource allocation, the M2M group control message comprising a M2M device resource schedule, a start index value, a first resource block size value for a first M2M device, and a differential indicator for a second M2M device, at block 402. Continuing with the example given with reference to block 314 of the logic flow 300, the M2M control component 122-3 may generate the M2M group control message 130 with the resource allocation 128-1. The resource allocation 128-1 may comprise a M2M device resource schedule, a start index value, a first resource block size value for a first M2M device, and a differential indicator for a second M2M device.

The logic flow 400 may determine whether to set the differential indicator for the second M2M device to one of two different values at diamond 404. The M2M control component 122-3 may test whether the first resource block size value for the first M2M device matches a second resource block size value for the second M2M device at diamond 404.

The logic flow 400 may set the differential indicator to a single bit when a second resource block size value for the second M2M device matches the first resource block size value for the first M2M device at block 406. For instance, the M2M control component 122-3 may set the differential indicator to a zero (0) or a one (1) when there is a match in the previous resource block. In this manner, the control overhead is reduced to a single bit.

The logic flow 400 may set the differential indicator to the second resource block size value when the second resource block size value for the second M2M device does not match the first resource block size value for the first M2M device at block 408. For instance, the M2M control component 122-3 may set the differential indicator to the resource block size.

The logic flow 400 may be repeated as needed for as many M2M devices in the M2M group 124-1, until the last M2M device has been processed. In this manner, only those M2M devices with different packet sizes need to have complete resource block size values encoded in the M2M group control message 130, while those with the same packet sizes may be represented by one resource block value and a single bit for each M2M device with the same packet size.

Once the M2M control component 122-3 generates a M2M group control message 130 for the M2M group 124-1 with the MGID 126-1 and the resource allocation 128-1, the M2M control component 122-3 may send the M2M group control message 130 to the M2M devices of the M2M group 124-1. The M2M group control message 130 may be sent in a DL control channel from the apparatus 100, or a device implementing the apparatus 100 (e.g., a base station, ABS or eNodeB), to the one or more M2M devices. The DL control channel may be a dedicated control channel or a broadcast control channel. The embodiments are not limited in this context.

In various embodiments, the M2M group control message 130 may be sent as a control message as defined by one or more IEEE 802.16 Standards, such as IEEE 802.16p, for example. As defined in IEEE 802.16p, the M2M group control message 130 may be sent as a physical (PHY) layer media access protocol (MAP) message with a downlink (DL) control structure comprising one or more downlink control information elements (IEs), such as a DL-MAP message. In one embodiment, the M2M group control message 130 may be sent as one or more Assignment A-MAP IE types as defined in Table 191 of Section 6.3.5.5.2.4, reproduced as Table 2 as follows:

TABLE 2

| A-MAP IE Type | Usage | Property |
| --- | --- | --- |
| 0b1100 | Broadcast Assignment A-MAP IE | Broadcast/Multicast |
| 0b1101 | UL M2M Persistent Allocation A-MAP IE | N/A |
| 0b1110 | M2M Group Assignment A-MAP IE | Multicast |
| 0b1111 | Extended Assignment A-MAP IE | N/A |

Further, a cyclic redundancy check (CRC) mask may be used as defined in Table 192 of Section 6.3.5.5.2.4, reproduced as Table 3 as follows:

TABLE 3

| Masking Prefix (1 bit MSB) | Remaining 15 bit LSBs | |
| --- | --- | --- |
| 0b0 | Type Indicator | Masking Code |
| | 0b000 | 12 bit STID or TSTID |
| | 0b001 | Refer to Table 193 |
| | 0b010 | Refer to Table 194 |
| | 0b011 | LSB 12 bits of FMDID or LSB 12 bits of DID |
| | 0b100 | 12 bit MGID |
| 0b1 | 15-bit RA-ID: The RA-ID is derived from the AMS's random access attributes [i.e., superframe number (LSB 5 bits), frame_index (2 bits), preamble code index for ranging or BR (6 bits) and opportunity index for ranging or BR (2 bits)] as defined below: RA-ID = (LSB 5 bits of superframe number|frame_index| preamble_code_index|opportunity_index) | |

Although the M2M group control message 130 is described as a control message defined by one or more IEEE 802.16 Standards, such as IEEE 802.16p, it may be appreciated that any control message as defined by any air interface may be used to send the M2M group control message 130. For example, the M2M group control message 130 may be sent with a control message defined by one or more 3GPP LTE Specifications, among others. The embodiments are not limited in this context.

Once a M2M device of a M2M group 124-c receives the M2M group control message 130, it may decode the M2M group control message 130 to retrieve the resource allocation 128-e. The M2M device may then initiate procedures to receive data packets according to the M2M device resource map of the resource allocation 128-e. For instance, the M2M device may move from an idle mode to a connected mode by applying power to a radio-frequency (RF) interface for the M2M device, and initiate scanning operations in the DL control channel for data packets from the scheduled resource (e.g., a time slot).

Figure 5:
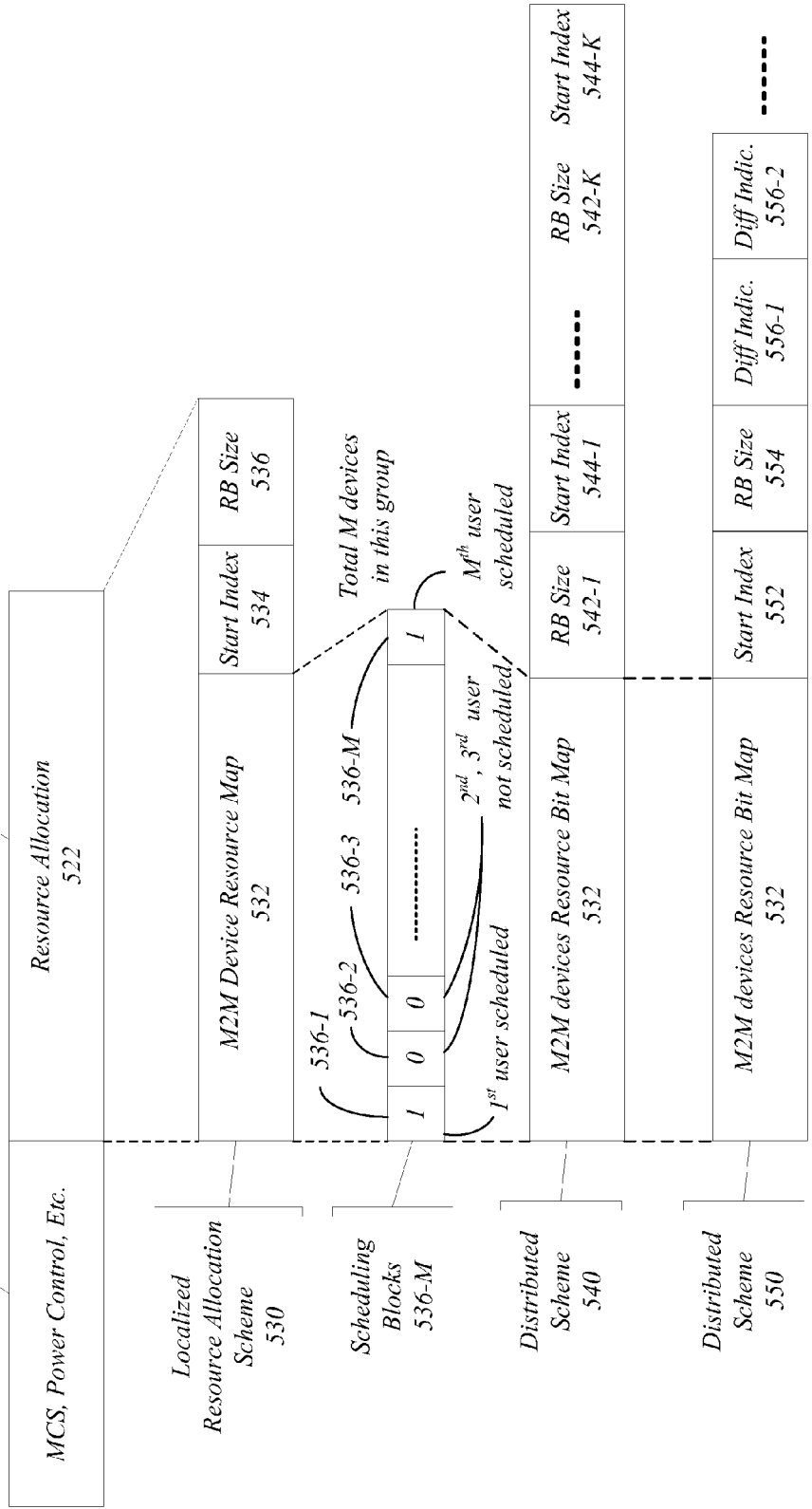
FIG. 5 illustrates an embodiment of a message format for the apparatus.

FIG. 5 illustrates a message format 500 suitable for control messages sent from apparatus 100 implemented in a base station, ABS or eNodeB to M2M devices in the M2M group 124-1.

The message format 500 illustrates a common control message 502. The common control message 502 includes control information that is common to all M2M devices within a M2M group 124-c. As previously described, the proliferation of M2M devices in a network may result in massive amounts of control messages and/or signals to manage the M2M devices. One technique to reduce this volume of control overhead is to assign multiple M2M devices to a M2M group, and apply M2M group control signaling for the entire M2M group. Common control messages 502 could then be shared by all M2M devices in a given M2M group 124-1. For example, if M2M devices were grouped according to a SDU size and CQI, common control messages 502 for MCS and power control may be sent to the entire M2M group 124-1. This would reduce control overhead of a M2M group 124-1 of K devices to 1/K, where K represents any positive integer.

The message format 500 also illustrates a more detailed example of an exemplary M2M group control message 130. The exemplary M2M group control message 130 shown in FIG. 5 may illustrate a sample digital data transmission or packet data unit (PDU) suitable for a network to communicate control information to multiple M2M devices of a M2M group 124-1. In one embodiment, the M2M group control message 130 may be PDU constructed in accordance with one or more 3GPP LTE Specifications. In one embodiment, the M2M group control message 130 may be a PDU constructed in accordance with one or more IEEE 802.16 Standards. Other packet or message formats may be used as well, and the embodiments are not limited to these examples.

In the illustrated embodiment shown in FIG. 5, the exemplary M2M group control message 130 may include a resource allocation 522. The resource allocation 522 may be representative of, for example, one or more of the resource allocations 128-e.

The resource allocation 522 may be generated in accordance with a localized resource allocation scheme 530. As shown, the resource allocation 522 may include a M2M device resource map 532, a start index 534, and a resource block size 536. Since the localized resource allocation scheme 530 assumes a uniform packet size for all M2M devices in a M2M group 124-c, only a single start index 534 and resource block size 536 are needed.

The M2M device resource map 532 may comprise one or more scheduling blocks 536-M, where M represents a total number of M2M devices in a M2M group 124-c. Each of the scheduling blocks 536-M may include a value indicating whether a data packet is scheduled for a corresponding M2M device. For instance, a first scheduling block 536-1 may be assigned to a first M2M device m1, a second scheduling block 536-2 may be assigned to a second M2M device m2, and so forth until the $M^{th}$ user is scheduled. The first scheduling block 536-1 includes a value one (1) indicating that a data packet is scheduled for m1, while second and third scheduling blocks 536-2, 536-3 include a value zero (0) indicating that no data packet is scheduled for m2, m3, respectively.

Alternatively, the resource allocation 522 may be generated in accordance with a distributed resource allocation scheme 540 with explicit resource information. As shown, the resource allocation 522 may include a M2M device resource map 532, and a resource block size 542-K and a start index 544-K for each M2M device in a M2M group 124-c, where K represents a number of M2M devices in a M2M group 124-c. Since the distributed resource allocation scheme 540 assumes a variable packet size for each M2M device in a M2M group 124-c, each one needs a corresponding start index 544-K and resource block size 542-K.

Alternatively, the resource allocation 522 may be generated in accordance with a distributed resource allocation scheme 550 with differential resource information. As shown, the resource allocation 522 may include a M2M device resource map 532, a start index 552, a resource block size 554, and multiple differential indicators 556-N, where N represents a number of M2M devices–1 in a M2M group 124-c. The resource block size 554 may be for a first M2M device m1, the differential indicator 556-1 may be for a second M2M device m2, the differential indicator 556-2 may be for a third M2M device m3, and so forth to the $N^{th}$ M2M device. The differential indicator 556-N may comprise either a single bit (e.g., 0) when it matches the preceding resource block size, otherwise it is set to the actual resource block size, as described in logic flow 400 with reference to FIG. 4.

Figure 6:
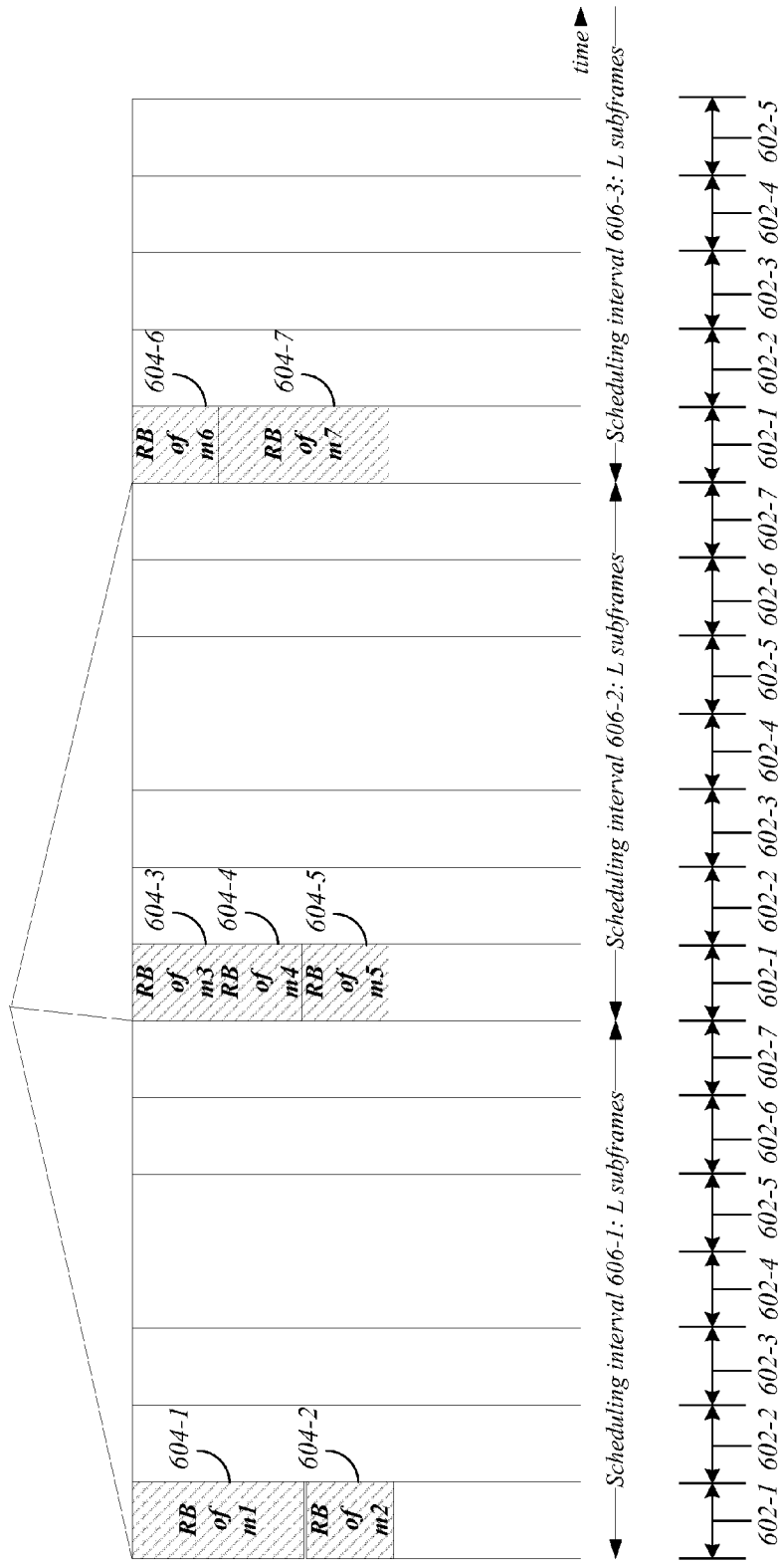
FIG. 6 illustrates an embodiment of a scheduling pattern for the apparatus.

FIG. 6 illustrates an exemplary scheduling pattern 600 for a M2M group control message 130. As previously described, data bursts for multiple M2M devices can be bundled using enhanced M2M group signaling. This may significantly reduce control signaling overhead (e.g., resource allocation) for M2M devices.

In some cases, the bundled packet size may fit within a basic scheduling period for a given wireless network, such as a frame or subframe, for example. In such cases, the M2M control component 122-3 may send the M2M group control message 130 to the M2M devices in the M2M group 124-1 with the MGID 126-1 in a single frame or subframe.

In some case, however, the bundled packet size may become too large to be scheduled in a basic scheduling period for a given wireless network, such as a frame or subframe, for example. In such cases, a scheduling pattern 600 may be defined across multiple frames or subframes to further reduce control signal overhead while maintaining persistent scheduling for M2M groups 124-c.

In one embodiment, the M2M control component 122-3 may send the M2M group control message 130 to the M2M devices in the M2M group 124-1 with the MGID 126-1 in multiple frames, subframes, or other defined interval for a given wireless network. For example, assume a wireless network utilizes a repeating scheduling interval 606-p, each having subframes (or frames) 602-L, where L represents a number of subframes in the scheduling interval 606. The M2M control component 122-3 may send the M2M group control message 130 in accordance with the scheduling pattern 600. As shown in FIG. 6, a resource block (RB) 604-1 for M2M device m1 and a RB 604-2 for M2M device m2 may be scheduled in subframe 602-1 of the scheduling interval 606-1. Similarly, RB 604-3, 604-4, 604-5 for M2M devices m3, m4, m5, respectively, may be scheduled in subframe 602-1 of the scheduling interval 606-2. Further, RB 604-6, 604-7 for M2M devices m6, m7, respectively, may be scheduled in subframe 602-1 of the scheduling interval 606-3. The scheduling pattern 600 may be repeated in each of the repeating scheduling intervals 606-$p$.

Figure 7:
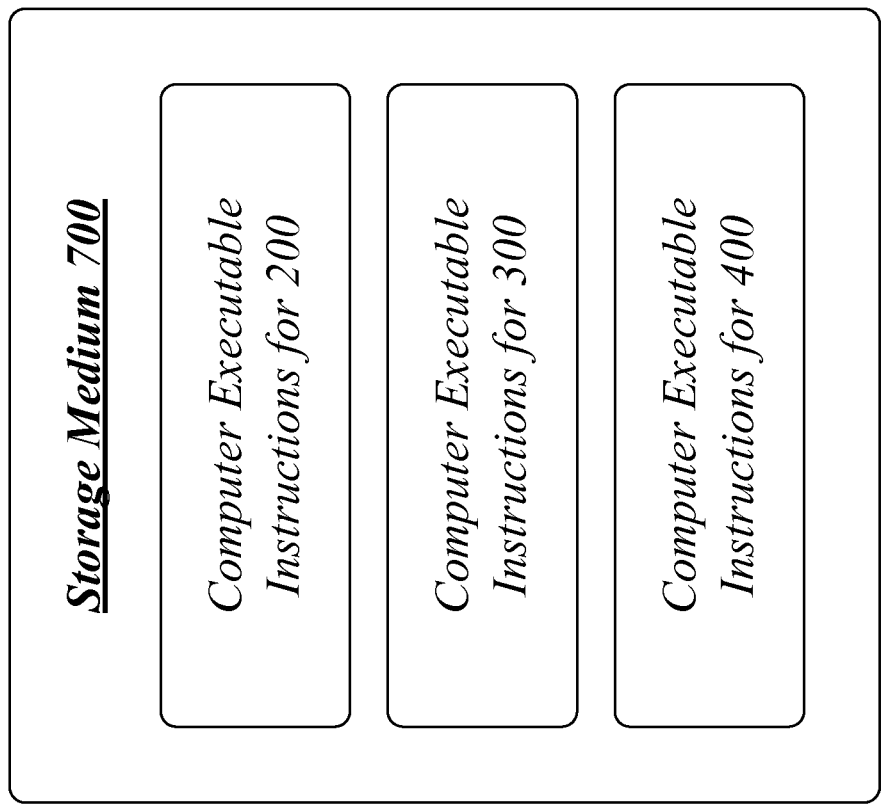
FIG. 7 illustrates an embodiment of a storage medium.

FIG. 7 illustrates an embodiment of a storage medium 700. The storage medium 700 may comprise an article of manufacture. In one embodiment, the storage medium 700 may comprise any non-transitory computer readable medium or machine readable medium, such as an optical, magnetic or semiconductor storage. The storage medium may store various types of computer executable instructions, such as instructions to implement one or more of the logic flows 200, 300 and/or 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
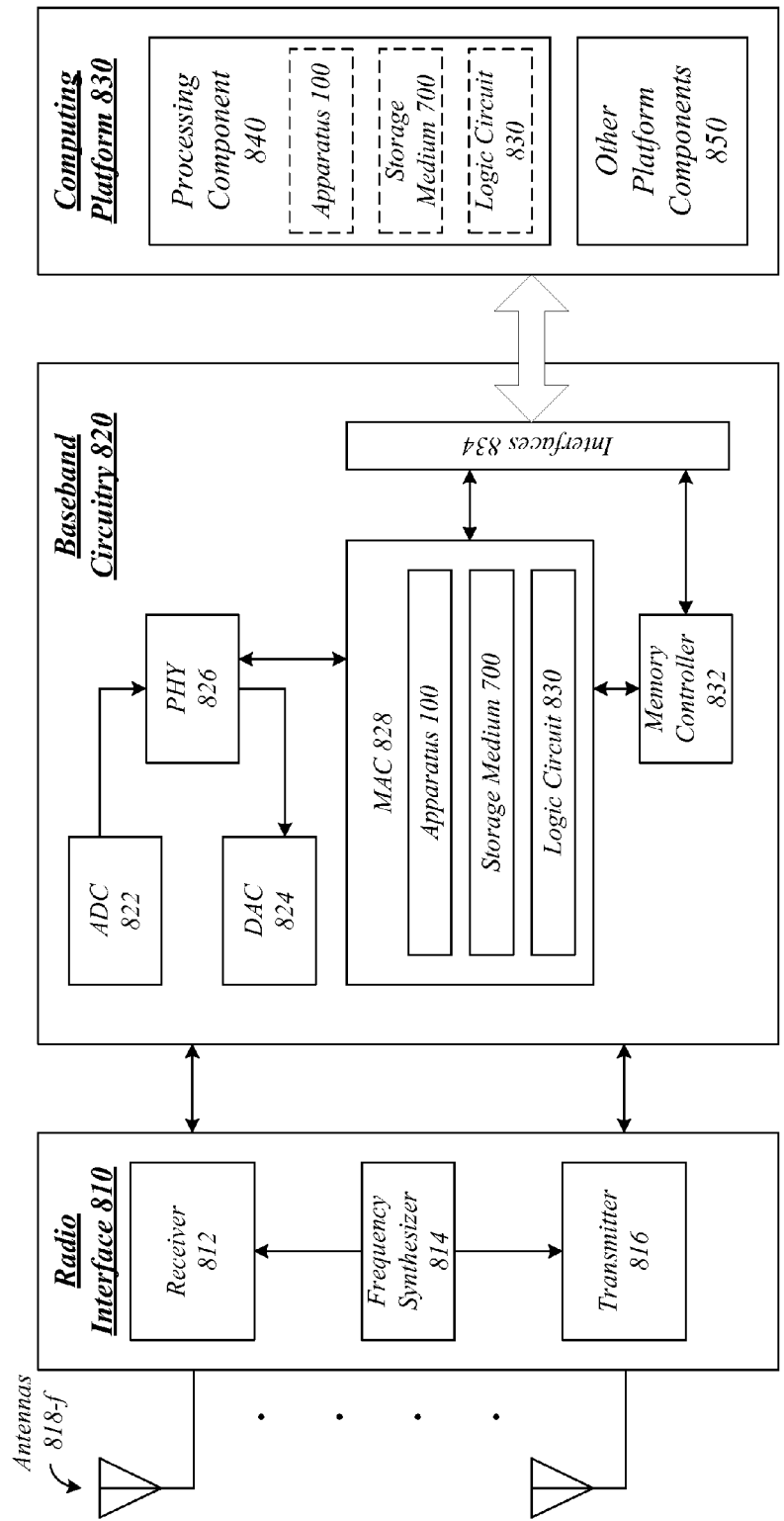
FIG. 8 illustrates an embodiment of a device.

FIG. 8 illustrates an embodiment of a device 800 for use in a broadband wireless access network. Device 800 may implement, for example, apparatus 100, storage medium 700 and/or a logic circuit 830. The logic circuit 830 may include physical circuits to perform operations described for apparatus 100. As shown in FIG. 8, device 800 may include a radio interface 810, baseband circuitry 820, and computing platform 830, although embodiments are not limited to this configuration.

The device 800 may implement some or all of the structure and/or operations for the apparatus 100, storage medium 700 and/or logic circuit 830 in a single computing entity, such as entirely within a single device. Alternatively, the device 800 may distribute portions of the structure and/or operations for the apparatus 100, storage medium 700 and/or logic circuit 830 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-$f$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 856 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames, such as packet 600. Alternatively or in addition, MAC processing circuit 828 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for the apparatus 100, storage medium 700, and logic circuit 830 using the processing component 830. The processing component 830 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuit 120), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired. In some embodiments, device 800 may be configured to be compatible with protocols and frequencies associated one or more of the 3GPP LTE Specifications and/or IEEE 802.16 Standards for WMANs, and/or other broadband wireless networks, cited herein, although the embodiments are not limited in this respect.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
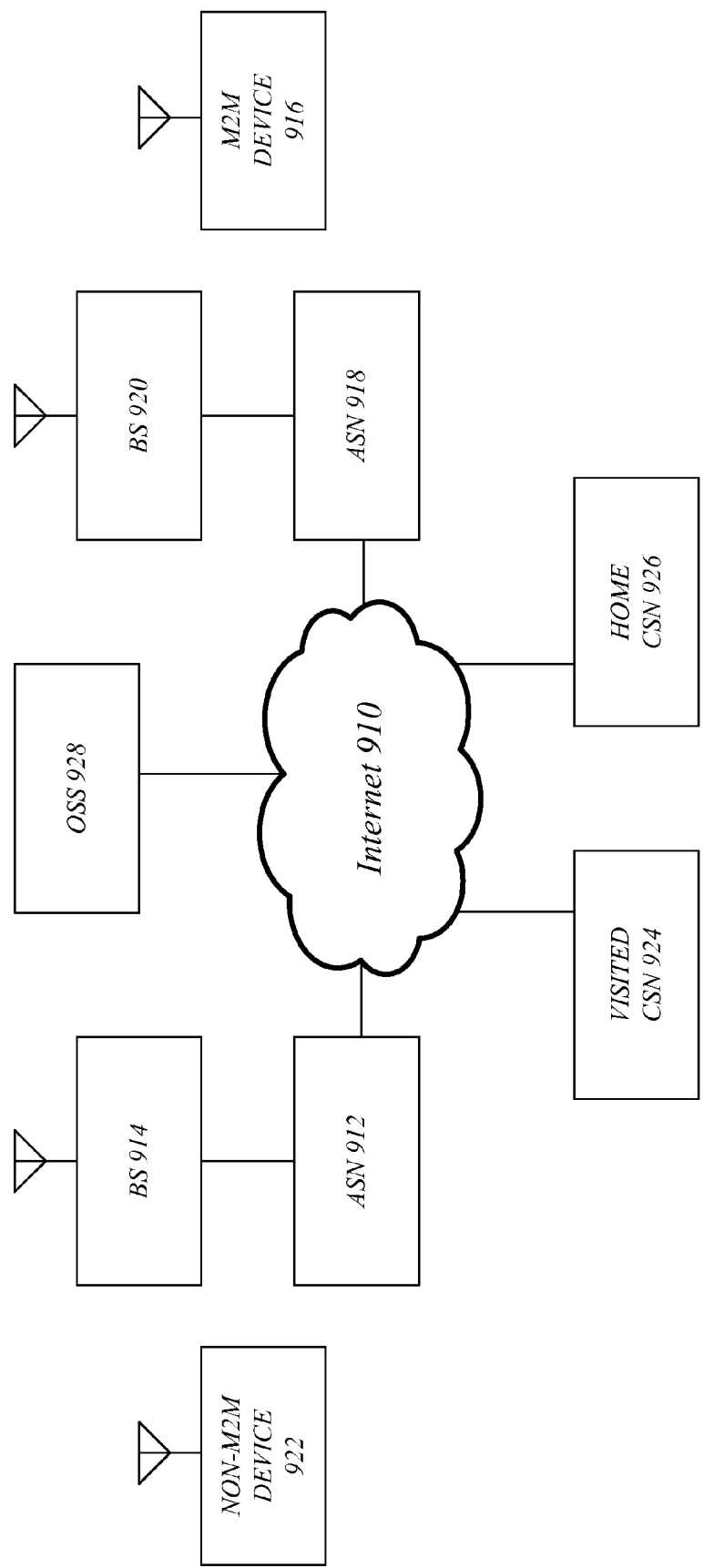
FIG. 9 illustrates an embodiment of a communications system.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 900, access service networks (ASN) 914, 918 are capable of coupling with base stations (BS) 914, 920 (or (or eNodeB), respectively, to provide wireless communication between one or more fixed devices 916 and internet 110, or one or more mobile devices 922 and Internet 110. One example of a M2M device 916 and a non-M2M device 922 is device 800, with the M2M device 916 comprising a M2M version of device 800 and the non-M2M device 922 comprising a non-M2M version of device 800. ASN 912 may implement profiles that are capable of defining the mapping of network functions to one or more physical entities on broadband wireless access system 900. Base stations 914, 920 (or eNodeB) may comprise radio equipment to provide RF communication with M2M device 916 and non-M2M device 922, such as described with reference to device 800, and may comprise, for example, the PHY and MAC layer equipment in compliance with a 3GPP LTE Specification or an IEEE 802.16 Standard. Base stations 914, 920 (or eNodeB) may further comprise an IP backplane to couple to Internet 910 via ASN 912, 918, respectively, although the scope of the claimed subject matter is not limited in these respects.

Broadband wireless access system 900 may further comprise a visited connectivity service network (CSN) 924 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 924 or home CSN 926, and the scope of the claimed subject matter is not limited in these respects. Visited CSN 124 may be referred to as a visited CSN in the case where visited CSN 924 is not part of the regular service provider of M2M device 916 or non-M2M device 922, for example where M2M device 916 or non-M2M device 922 is roaming away from their respective home CSN 926, or where broadband wireless access system 900 is part of the regular service provider of M2M device 916 or non-M2M device 922 but where broadband wireless access system 900 may be in another location or state that is not the main or home location of M2M device 916 or non-M2M device 922.

In one embodiment, M2M device 916 may be a fixed device located anywhere within range of one or both base stations 914, 920, such as in or near a home or business to provide home or business customer broadband access to Internet 910 via base stations 914, 920 and ASN 912, 918, respectively, and home CSN 926. It is worthy to note that although M2M device 916 is generally disposed in a stationary location, it may be moved to different locations as needed. Non-M2M device 922 may be utilized at one or more locations if the non-M2M device 922 is within range of one or both base stations 914, 920, for example.

In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

The invention claimed is:

1. A computer-implemented method, comprising:
    assigning multiple machine-to-machine (M2M) devices to a M2M group represented by a M2M group identifier (MGID) in order to perform M2M group control signaling for a wireless network;
    generating a resource allocation for the M2M devices of the M2M group;
    generating a M2M group control message with the resource allocation, the M2M group control message comprising a M2M device resource schedule, a start index value, a first resource block size value for a first M2M device, and a differential indicator for a second M2M device, the differential indicator comprising:
        a single bit when a second resource block size value for the second M2M device matches the first resource block size value for the first M2M device; or
        the second resource block size value when the second resource block size value for the second M2M device does not match the first resource block size value for the first M2M device; and
    sending the M2M group control message to the M2M devices in the M2M group with the MGID.

2. The computer-implemented method of claim 1, comprising generating the M2M group control message with the resource allocation comprising a M2M device resource map providing resource information as to when each M2M device is to communicate data.

3. The computer-implemented method of claim 1, comprising generating the M2M group control message with the resource allocation based on a distributed resource allocation scheme.

4. The computer-implemented method of claim 1, comprising sending the M2M group control message to the M2M devices in the M2M group with the MGID in a single frame or subframe.

5. The computer-implemented method of claim 1, comprising sending the M2M group control message to the M2M devices in the M2M group with the MGID in multiple frames or subframes.

6. An apparatus, comprising:
    logic, at least a portion of which is in hardware, the logic to manage M2M group control signaling in a wireless network for multiple M2M devices in a M2M group, the logic to generate a resource allocation for multiple M2M devices of a M2M group and generate a M2M group control message with the resource allocation, the M2M group control message to comprise a M2M device resource schedule, a start index value, a first resource block size value for a first M2M device, and a differential indicator for a second M2M device, the differential indicator to comprise:
        a single bit when a second resource block size value for the second M2M device matches the first resource block size value for the first M2M device; or
        the second resource block size value when the second resource block size value for the second M2M device does not match the first resource block size value for the first M2M device; and
    a radio frequency (RF) transceiver coupled to the logic, the RF transceiver arranged to transmit electromagnetic representations of the M2M group control message to the M2M devices in the M2M group.

7. The apparatus of claim 6, the logic to establish a wireless connection with the M2M devices.

8. The apparatus of claim 6, the logic to assign multiple M2M devices to a M2M group represented by a M2M group identifier (MGID).

9. The apparatus of claim 6, the RF transceiver arranged to transmit the electromagnetic representations of the M2M group control message to the M2M devices in the M2M group with a M2M group identifier (MGID) in a downlink (DL) control channel of the wireless network.

10. At least one non-transitory computer-readable storage medium comprising instructions that, when executed, cause a system to:
- generate a resource allocation for M2M devices of a M2M group;
- generate a M2M group control message with the resource allocation, the M2M group control message to comprise a M2M device resource schedule, a start index value, a first resource block size value for a first M2M device, and a differential indicator for a second M2M device, the differential indicator comprising:
  - a single bit when a second resource block size value for the second M2M device matches the first resource block size value for the first M2M device; or
  - the second resource block size value when the second resource block size value for the second M2M device does not match the first resource block size value for the first M2M device; and
- send the M2M group control message to the M2M devices in the M2M group.

11. The at least one non-transitory computer-readable storage medium of claim 10, comprising instructions that when executed cause the system to send the M2M group control message to the M2M devices in the M2M group in one or more frames or subframes.

* * * * *